J. Hatch,
Stuffing-Box.

N° 60,369.   Patented Dec. 11, 1866.

Witnesses:
J. W. Coombs
G. W. Reed

Inventor:
J. Hatch
his Attorneys
Brown, Coombs & Co.

United States Patent Office.

IMPROVEMENT IN PACKING REVOLVING JOINTS.

JONATHAN HATCH, OF SOUTH WINDHAM, CONNECTICUT, ASSIGNOR TO HIMSELF, C. SMITH, AND H. WINCHESTER, OF SAME PLACE.

Letters Patent No. 60,369, dated December 11, 1866.

The Schedule referred to in these Letters Patent and making part of the same.

TO ALL WHOM IT MAY CONCERN:

Be it known that I, JONATHAN HATCH, of South Windham, in the county of Windham, and State of Connecticut, have invented a certain new and useful Improvement in Revolving Joints of steam or hot water heated drying cylinders, calendar rolls and other devices, of which the following is a full, clear and exact description, reference being had to the accompanying drawing, forming part of this specification, in which—

Figure 1:
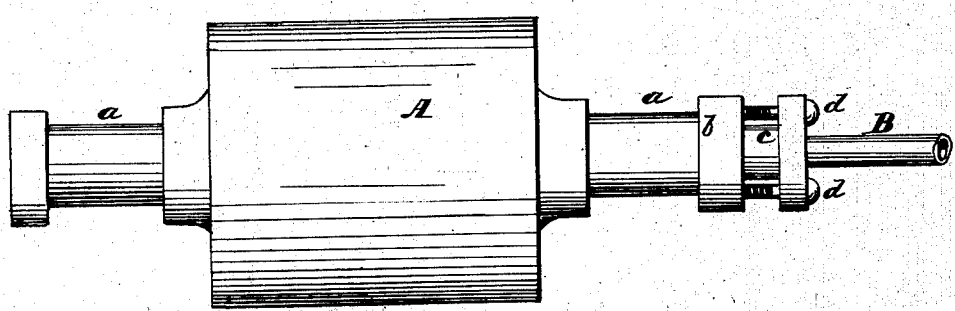
Figure 2:
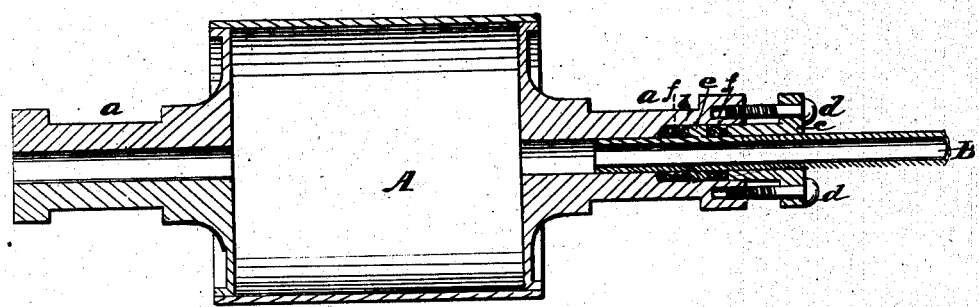

Figure 1 represents an outside longitudinal view of a steam heated drying cylinder with my improvement applied thereto, and Figure 2 a longitudinal section thereof.

Like letters refer to like parts in both figures.

The object of my improvement is to more effectually provide against leakage at the revolving joint of cylinders and rolls which are heated by the passage through them of steam or hot water. It will suffice here, however, to describe my invention in connection with a revolving drying cylinder, heated by steam, such as is so generally employed in the manufacture of textile fabrics. In these cylinders great difficulty has been experienced in keeping tight their junction with the inlet pipe. The importance of providing against leakage in such contrivances will be apparent when it is considered that the result to be attained is a drying one, against which all moisture arising from leakage is a draw-back. The usual mode of establishing the connection of the steam-pipe with said cylinder has been by projecting the pipe into the latter through an ordinary stuffing box and gland arranged at its one end of journal, and provided with any suitable soft or fibrous packing. This merely secures a circumferential binding of the packing on the pipe, without any end pressure or bearing thereon, which, though the gland be frequently tightened at a great inconvenience and loss of time, does not prevent the steam and condensed vapor from oozing or working its way round the pipe and through the stuffing box and gland, such packing presenting two straight lines of escape, namely, through the stuffing box around the exterior of the packing and gland, and through or past the inner surfaces of the two latter, and around or along the pipe, which has no solid or other bar than the circumferential binding of the soft packing on it, to such last mentioned line of escape. These remarks apply also to the exit end of the cylinder, to which my improvement is likewise applicable, but it will be sufficient to refer to it here in connection with one, say the inlet pipe; and my improvement consists in providing the pipe, in such a connection, with a collar and packing round the pipe on either side of it, which packing is tightened, not merely by the screwing down of the gland in the stuffing box, but also by the collar through the expansion of the pipe as it becomes heated in passing the steam or hot water. This collar stops the joint or passage round the pipe, confines the escape, if any, past the exterior of the double packing, and establishes, in addition to the circumferential binding of the packing, an end pressure or bearing on the pipe or its collar in direction of the length of the pipe. In further explanation of this my improvement, A, in the accompanying drawing, represents an ordinary drying cylinder, with its journals $a\ a$, either one of which is bored out to form a stuffing box, $b$, into the mouth of which fits a gland $c$ that may be tightened up in the usual manner by screws, $d$, and through which and the stuffing box the pipe B projects into communication with the cylinder. This pipe B, which may be the inlet for the steam from the boiler, while the escape may be through the opposite journal of the cylinder, is made with a fast collar $e$, of about the internal diameter of the stuffing box $b$, in which it fits, and is arranged so as to leave a space for packing or packings $ff'$, on either side of the collar, and between it and the inner ends of the stuffing box and gland. From this description it will be obvious that on screwing up the gland, not only is the outer packing forced circumferentially outward against the stuffing box and pipe, but also against the outer face of the collar $e$, while the expansion of the pipe as it is heated by the steam passing through it, causes the inner face of said collar to similarly force out circumferentially the inner packing $f'$, and likewise to induce pressure of it against the inner end of the stuffing box and interior face of the collar, thus forming two close packings with only one gland adjustment, also establishing an endwise packing of the pipe, and limiting the leakage or escape to one line or passage, namely, round the periphery of the collar and exterior of the outer packing and gland, which the inner packing almost, if not altogether effectually prevents, thereby securing to the drying cylinder perfect, or nearly so, freedom from leakage.

What I claim as new and useful herein, and desire to secure by Letters Patent, is—

The combination, with the stuffing box $b$ and gland $c$ of the pipe B, formed with a collar, $e$, and provided with packings $ff'$ on each side or face of said collar, substantially as and for the purpose or purposes herein set forth.

JONATHAN HATCH.

Witnesses:
GUILFORD SMITH,
L. C. KIMO.